(12) United States Patent
Reichelsheimer

(10) Patent No.: US 7,973,098 B2
(45) Date of Patent: Jul. 5, 2011

(54) POSTAL-COMPLIANT FLUORESCENT INKJET PAPERS, INKS FOR PREPARING THEM AND INDIVIDUALIZED POSTAGE STAMPS PRINTED THEREON

(75) Inventor: Jay Reichelsheimer, Shelton, CT (US)

(73) Assignee: Pitney Bowes Inc., Stamford, CT (US)

( * ) Notice: Subject to any disclaimer, the term of this patent is extended or adjusted under 35 U.S.C. 154(b) by 793 days.

(21) Appl. No.: 11/857,267

(22) Filed: Sep. 18, 2007

(65) Prior Publication Data

US 2009/0075085 A1    Mar. 19, 2009

(51) Int. Cl.
| | |
|---|---|
| *B41J 2/01* | (2006.01) |
| *B41J 2/17* | (2006.01) |
| *B60C 1/00* | (2006.01) |
| *C08G 73/10* | (2006.01) |
| *C08J 3/00* | (2006.01) |
| *C08J 7/02* | (2006.01) |
| *C08K 3/20* | (2006.01) |
| *C08K 3/34* | (2006.01) |
| *C08K 5/05* | (2006.01) |
| *C08K 5/06* | (2006.01) |
| *C08K 5/34* | (2006.01) |
| *C09D 5/00* | (2006.01) |
| *C09D 11/00* | (2006.01) |
| *C09D 11/10* | (2006.01) |
| *G01D 11/00* | (2006.01) |

(52) U.S. Cl. .................. 523/161; 106/31.13; 106/31.15; 347/1; 347/84; 347/95; 347/100; 523/160; 524/104; 524/366; 524/386; 524/389; 524/492; 524/493

(58) Field of Classification Search .................. 523/160, 523/161; 524/104, 366, 386, 389, 492, 493; 106/31.13, 31.15; 347/1, 84, 95, 100
See application file for complete search history.

(56) References Cited

U.S. PATENT DOCUMENTS

| | | |
|---|---|---|
| 5,837,042 A | 11/1998 | Lent et al. |
| 5,969,003 A * | 10/1999 | Foucher et al. ............... 523/160 |
| 5,988,807 A | 11/1999 | Bernard et al. |
| 6,284,027 B1 | 9/2001 | Auslander et al. |
| 6,488,867 B1 | 12/2002 | Matsumoto et al. |
| 6,905,538 B2 | 6/2005 | Auslander .................. 106/31.15 |
| 2003/0041774 A1 | 3/2003 | Auslander et al. |
| 2004/0231554 A1* | 11/2004 | Udagawa et al. .......... 106/31.15 |
| 2005/0150422 A1* | 7/2005 | Umemura et al. ......... 106/31.15 |
| 2005/0280686 A1 | 12/2005 | Bernhard et al. ............. 347/105 |
| 2006/0136347 A1 | 6/2006 | Reichelsheimer et al. ... 705/408 |
| 2006/0293409 A1 | 12/2006 | Sanchez et al. ............... 523/160 |

FOREIGN PATENT DOCUMENTS

| | | | |
|---|---|---|---|
| EP | 779348 | * | 6/1997 |
| EP | 1435379 A1 | | 7/2004 |
| EP | 1887527 A1 | | 2/2008 |
| WO | 2008065085 A1 | | 6/2008 |

* cited by examiner

*Primary Examiner* — Patrick D Niland

(74) *Attorney, Agent, or Firm* — George M. Macdonald; Steven J. Shapiro

(57) ABSTRACT

Described are new custom postage printing stocks, coating compositions, processes for preparing and utilizing these and resulting postage products. Disclosed ink formulations comprise: invisible fluorescent dye and/or pigment (preferably red-fluorescent dye), which is fluorescent in the range of 580 to 640 nm when illuminated with light at 254 nm; water-soluble binder; substrate penetrant, fluorescence stabilizer; substrate anticurl agent and water. The inks, when coated on substrates and dried, can improve the quality and color of images printed as compared to images printed without the aid of the invention.

4 Claims, 2 Drawing Sheets

POSTAL-COMPLIANT FLUORESCENT INKJET PAPERS, INKS FOR PREPARING THEM AND INDIVIDUALIZED POSTAGE STAMPS PRINTED THEREON

The invention is directed to stock materials, especially for postal use, which are impregnated with fluorescent markers and can be printed on by commercial inkjet printers. The invention also provides fast-drying, postal-compliant fluorescent ink formulations useful for preparing them.

There is a growing market for customized or personalized postage, giving individuals the opportunity to dress up their mailings with individualized images and/or text. Vendors providing such postage have sometimes utilized programmable computers connected by the internet or direct telephone line to a secure postage supply. Various arrangements have been provided for sending input information to the computer for postage and other information to enable individualized postage to be printed, such as by thermal printing. Laser jet processes have been used for commercial-scale, centralized individualized postage printing. Importantly, individualized postage documents must comply with postal regulations and there are is a need for papers which will permit this when using commercial ink jet printers.

In a typical postal system, such as the United States Postal Service (USPS), automated processing and sorting equipment is utilized in mail processing centers to provide for efficient processing and delivery of the mail. An important function is to identify the face of a postal item and properly orient it for processing. Equipment serving this function is known as a facer and is often used in combination in a facer-canceler, which is defined by the USPS as mail processing equipment that automatically faces letter-size mail in a uniform orientation and cancels the postage stamps. Applicant is unaware of any system capable of printing a photo-quality custom image by inkjet printing and also making the postage USPS-compliant. Advantageously, the attractiveness of the stamps are greatly improved by using such an image and avoiding the need for a separate facing identification mark (FIM), which is typically printed as a series of bars placed in a specific spot on the envelope.

Such facer-canceller equipment can be used to correctly orient the mail so that address information, postage payment evidencing information and other related information could be scanned and read. The equipment may also decide to divert certain mail pieces so that the evidence of postage payment may be cancelled, such as by printing a cancellation image over a stamp to prevent its reuse. Several alternative methods of payment evidencing are permitted, including denominated postage stamps, postage meter indicia and permit mail, and several different facing-canceling processes have been developed for use in one or more mail processing streams. Whatever their configuration, they require some means to identify the address side of a mail piece and the postage information. Typically, luminescent inks are employed in the printed postage information, and can be either fluorescent or phosphorescent.

In the United States, postage stamps are typically coated with a green phosphorescent material that may be detected by facer-canceller equipment. The facer equipment will typically use the green phosphorescent properties of the stamp or stamps to identify the front-top-right of the mail piece to enable proper orientation. It will then divert the mail piece for stamp cancellation. The canceller will cancel the stamp or stamps such as by printing a black cancellation image over the stamps to prevent their reuse.

Postage printed by meter in the United States must include an approved ink, specifically one which fluoresces in the range of 580 to 640 nm when illuminated with light at 254 nm (to be referred to herein as 580-640 nm fluorescence). When a suitably fluorescent ink is used, preferably red-fluorescent, the facer can use the fluorescent properties of that ink to identify the front-top-right of the mail piece to enable proper orientation. The system will not typically cancel metered indicia because there are other mechanisms to prevent reuse. However, it is essential that the facing function be performed effectively even if custom, often full-color, images are employed as components of custom postage.

In U.S. Pat. No. 5,717,597, Kara describes a postage meter system for custom printing postage stamps, including a desired postage amount and a personalized postage indicia onto a label or an envelope for use in conjunction with a computer-generated greeting card. The system is intended to automatically calculate the postage due for a specific greeting card, print that postage amount as a meter stamp, interact with the customer to generate personalized stamp indicia, encrypt selected information into a machine readable format, and print the information entered by the customer in a selected format. The disclosure does not go into any detail on the nature of the ink or the printing process so that inkjet printing and acceptance by the United States Postal Service (USPS) are enabled. The printing of full-color images by inkjet printing in the production of a full-color image is a distinct challenge.

In U.S. Pat. No. 6,939,062, Ogg, et al., describe a postage meter printing system for assisting a user with the proper feeding of sheets of labels into a printer so that the labels may be properly printed with custom postage and other indicia. The system provides a sheet bearing pre-printed labels for further printing with postage indicia and a target marker. Interactive computer software guides a user to feed a sheet of labels into the printer, directs the printer to print an indication mark on the sheet of labels, and queries the user as to where an indication mark appears on the sheet of labels. Again, no details of inks or printing process are provided.

Ink jet printing has a number of commercial advantages for custom postage printing, but the ability to utilize it for custom printing USPS-compliant postage has not heretofore been available. USPS compliant inks are provided for several mailing machines and postage meters from Pitney Bowes of Stamford, Conn., but they are of unique formulations and colors not immediately suitable for full-color custom printing. Inkjet printing inks have been described in U.S. patents including U.S. Pat. No. 5,091,006, issued Feb. 25, 1992 to Sarada, et al., U.S. Pat. No. 5,290,348, issued Mar. 1, 1994 to Auslander, U.S. Pat. No. 5,681,381, issued Oct. 28, 1997 to Auslander, et al., and U.S. Pat. No. 6,284,027, issued Sep. 4, 2001 to Auslander, et al. Additionally, some mailing machines and postage meters have used thermal printing techniques. For example, U.S. Pat. No. 5,393,148 issued Feb. 28, 1995 to Berson describes an apparatus using a thermal ribbon and is incorporated herein by reference. However, inks of these types or others are not known for printing custom postage suitable for inkjet printing of custom postage in a manner fully compliant with USPS regulations. And, when inkjet printing is employed for fluorescent marking, a separate cartridge for the fluorescent ink will be required for custom printing full-color images. This is not easily accommodated and would greatly increase equipment complexity and cost.

USPS-compliant postage must enable facing of the front-top-right corner of a mail piece so that proper orientation may be achieved in the mail piece processing equipment. The prior art does not provide an inkjet printable label stock that may be used for signaling and thus used for both indicia regions and non-indicia regions of a mail piece. There is a need to enable printing color images and indicia with commercial inkjet printers on a special substrate that meets USPS fluorescence requirements. The requirement for using fluorescent ink significantly restricts what can be printed, how it is printed, and the final appearance of the image.

In the past, certain attempts to flood coat a label substrate (e.g., single or sheets of labels or label stock or other printable media) to achieve acceptable print quality were unable to achieve acceptable results, and a fluorescent border instead has been provided at the outside the printable area. For a sheet-of-stamps application, certain attempts have been made to flood coat a printable substrate (full coverage) with fluorescent media, but this approach has been unacceptable for inkjet printing prior to the present invention. It has been my experience that fluorescent-flooded media become hydrophobic and resist penetration of a water-based inkjet inks. Thus, while papers can be made suitably fluorescent using current technology, they cannot then be printed well by inkjet printing.

There is a present need for new custom postage printing stocks and processes that enable printing custom postage, preferably including full-color images, utilizing inkjet inks to provide USPS-compliant postage. There is also a need for such stocks and processes that permit inkjet images to be printed in USPS-compliant postage, which are preferably invisible or white (under daylight) so that no color shift from the intended image occurs. Further, there is a need for ink compositions for preparing inkjet printable media using substrates not normally receptive to inkjet printing and yet enabling USPS compliance.

SUMMARY OF THE INVENTION

The invention provides new custom postage printing stocks, coating compositions, processes for preparing and utilizing these and resulting postage products. In the preferred aspects, at least one or more of the above needs of the art can be accomplished.

In one aspect, the invention provides ink formulations for use on printable media to prepare inkjet receptive postage printing stocks for printing USPS-compliant postage with an inkjet printer, wherein the inks comprise: invisible fluorescent dye and/or pigment (preferably red-fluorescent dye), which is fluorescent in the range of 580 to 640 nm when illuminated with light at 254 nm; water-soluble binder; substrate penetrant, fluorescence stabilizer; substrate anticurl agent and water; and, optionally, a hydrophilic drying promoter.

In another aspect, the invention provides a process for preparing a postage print stock, e.g., for use in preparing postage labels or label sock for printing custom postage, which comprises: applying an ink as defined above to a sheet substrate, and drying the ink.

In a further aspect, the invention provides postage print stock, e.g., for use in preparing postage labels for printing custom postage, which comprises: a substrate having on at least one surface thereof the dried residue of the ink defined above.

In yet another aspect, the invention provides printed postage, which comprises postage and custom indicia printed on a postage print stock as defined above.

Other alternative and preferred aspects of the invention will be described below.

BRIEF DESCRIPTION OF THE DRAWINGS

The invention will be better understood and its advantages will become more apparent from the following detailed description, especially when taken with the accompanying drawings, wherein.

DETAILED DESCRIPTION

Figure 1:
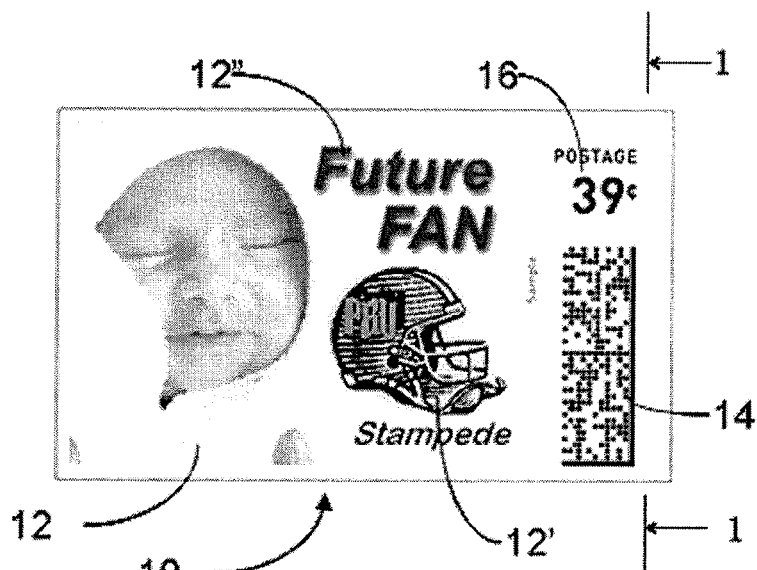
FIG. 1 is a schematic representation of postage printed with postage, personalized graphics and text, and a barcode, in accord with the invention.

The inks of the invention inks comprise: invisible fluorescent dye and/or pigment (preferably red-fluorescent), which is fluorescent in the range of 580 to 640 nm when illuminated with light at 254 nm; water soluble binder; hydrophilic drying promoter; substrate penetrant, fluorescence stabilizer; substrate anticurl agent and water. The ink formulations can be coated on any suitable substrate, e.g., a water-receptive substrate, and the dried ink is effective to render them inkjet receptive while adding the necessary postal fluorescent signature for facing. Substrates having an adhesive backing or to which one can be applied are preferred. The suitable dyes and/or pigments are referred to herein as invisible fluorescent compositions with 580-640 nm fluorescence. These compositions are characterized as having a fluorescent emission in the region of 580 to 640 nm, irrespective of the dominant or maximum wavelength. For example, a composition might be green fluorescent having an emission maximum of about 525 nm, but in suitable concentrations, the large peak at 525 nm extends into the 580-640 nm range).

The fluorescent compositions with 580-640 nm fluorescence useful in the invention are invisible, meaning that they will be essentially colorless on a white substrate and will not materially affect the color of the printed image. In other words, the coloration of a printed image will be essentially the same on plain paper and on that paper after having an ink of the invention applied thereto. In the case of dyes, the compositions are colorless and in the case of pigments, they will be white.

The term "postage printing stock" is meant to include substrates of paper or other materials of any suitable composition, including those normally receptive to inkjet printing and having coated thereon an ink as herein described that will provide a postal compliant red-fluorescent signal when illuminated by USPS facing equipment. The substrate can be regular paper, such as that prepared for copying, printing by laser, offset or inkjet printing, photographic reproduction, labels, and the like. Some embodiments of the invention enable printing by inkjet on substrates not normally receptive to inkjet printing, referred to herein as hydrophobic substrates.

The ink formulations of the invention can be used on substrates to prepare inkjet receptive postage printing stocks for printing USPS-compliant postage with an inkjet printer. The provision of such a capability enables a consumer or vendor to utilize the resulting postage printing stocks to generate custom postage, such as those containing a full-color photograph, logo or other graphic, preferably of photographic quality in that continuous tone images show no lines or dots to the unaided eye from 18 inches. A representative image is shown, for example, as 12 on stamp 10 in FIG. 1. The inks of the invention will comprise: invisible fluorescent dye and/or pigment (preferably red-fluorescent), which is fluorescent in the range of 580 to 640 nm when illuminated with light at 254 nm; water soluble binder; substrate penetrant; fluorescence stabilizer; substrate anticurl agent and water, and optionally a hydrophilic drying promoter. It is to be understood that the inks of the invention are not themselves formulated for inkjet printing, but for use in preparing postage printing stocks which can be effectively printed with conventional, unmodified inkjet printers without degradation in image quality or color. Indeed, the inks of the present invention, when coated on substrates and dried, e.g., to a thickness of at least about 0.0001 inch, can improve the quality and color of images printed as compared to images printed without the aid of the invention. And, some embodiments enable inkjet printing on substrates not normally receptive to such.

The inks of the invention, which are intended for coating printable substrates to render the substrates satisfactorily USPS-compliant fluorescent without degrading image color or quality, will include invisible fluorescent dye and/or pigment (preferably red-fluorescent), which is fluorescent in the range of 580 to 640 nm when illuminated with light ultraviolet light. Preferred among these are red fluorescent dyes but other colors work as well, such as green, yellow, and orange fluorescing compounds. The following is a list of alternatives: Lumilux Red CD105, Red CD106, Green CD112, Green CD 116, Green CD 117, Yellow-Orange CD 130, Yellow Orange CD 135, White Yellow CD304, Red CD330, Red CD340, Yellow CD 382, Green CD 397, Red/Green CD770. This latter material works for facing in mail and has the added security benefit of turning green with long wave excitation. Among additional materials are those available from Angstrom Technologies, e.g., SC6 Yellow, Sc27 Yellow, SC 14 Orange, SC 25 Orange, SC 22 Orange, SC 19 Green-Yellow. In addition, pigments such as Beaver Luminescers L212 and L187 will also work. These materials are not direct replacement for dyes, however, because not all are water soluble and may need to be blended with an effective amount of a dispersant, e.g., a surfactant. These dyes and pigments are characterized by a very light to invisible color under visible white light and fluorescence in the range of from about 580 to about 640 nm when illuminated with ultraviolet light, e.g., at a wave length of about 254 nm. The dyes will preferably be water soluble and the pigments will be water dispersible. The dye and/or pigment will be employed in the inks at a concentration effective to provide an image meeting USPS criteria when utilized to prepare the postage printing stocks of the invention. Typically, the dye and/or pigment concentration will be within the range of from about 0.5 to about 15 percent of the weight of the ink, e.g., from about 0.5 to about 2.5 percent of the weight of the ink. The preferred inks are red fluorescent (some are actually both fluorescent and phosphorescent, but the fluorescence is the important property in the context of the invention) and exhibits a PMU of 42 when measured in a barcode area printed on a sample image on inkjet photo paper. Inks will preferably have PMU values of at least about 40. The Fluorescence is measured in shaded area, e.g., dark printed areas in the barcode 14 in FIG. 1, with a USPS LM-2C PMU Meter. (PMU=Phosphor Meter Units)

Also important to the ink compositions of the invention is the presence of a binder, typically a water-soluble polymer, such as polyvinyl polyvinylpyrrolidone. The water-soluble polymer is preferably of a low or medium molecular weight, which is effective to permit penetration or spread during application but will maintain image sharpness when printed by inkjet printing on a wide variety of paper types. The use of a low or medium molecular weight water soluble resins, such as polyvinyl alcohol resins (PVA) (e.g., MW of from about 1,000 to about 20,000, preferably from about 8,000 to about 12,000) and polyvinyl pyrolidone (PVP) (e.g., MW of from about 2000 to about 30,000, preferably from about 2,500 to about 8,000), improves the properties of the dye-based inks on substrates difficult to penetrate and, therefore, improves the fixation of images printed thereon. Also among other suitable polymers having the correct properties is 5,5-dimethyl hydantion formaldehyde resin. The polymer will be used in an amount effective for these purposes, which is typically within the range of at least about 0.5 percent, preferably up to about 5 percent, e.g., from about 1 percent to about 3 percent, for hydrophilic substrates. In the case of formulations for application to hydrophobic substrates, the hydrophilic polymers, when used in sufficiently high concentrations, will render the substrate hydrophilic to enable inkjet printing and provide anticurl properties. For hydrophobic substrates, the formulations will contain at least about 5 percent polymer and preferably greater than 15%, e.g., from about 25 to about 40 percent of one or more polymers.

The inks of the invention will preferably include components, including drying promoting materials, which assure rapid and effective drying. One preferred drying promoter is isopropyl alcohol. Several drying promoters work through evaporation such as alcohols, acetates and ketones (isopropyl alcohol, ethanol, isopropanol, isobutanol, ethyl acetate, propyl acetate, acetone). Other solvents can also be used such as toluene, xylene, methyl ethyl ketone, methyl isobutyl ketone, methylene chloride but due to safety and environmental issues Isopropyl alcohol is preferred. This component will typically be present in an amount of from about 5% to about 35% percent by weight.

It is important for the inks to penetrate or otherwise wet the substrate with the ink containing the effective dye and other components. To this end a penetrant is employed, such as triethylene glycol mono butyl ether (BTG), ethylene glycol methyl ether, ethylene glycol-n-ethyl ether, ethylene glycol-n-propyl ether, ethylene glycol-n-butyl ether, ethylene glycol isobutyl ether, diethylene glycol methyl ether, diethylene glycol ethyl ether, diethylene glycol-n-propyl ether, diethylene glycol-n-butyl ether, diethylene glycol isobutyl ether, triethylene glycol methyl ether, triethylene glycol-n-ethyl ether, triethylene glycol-n-propyl ether, triethylene glycol-n-butyl ether and triethylene glycol isobutyl ether, glycol methyl ether, propylene glycol ethyl ether, propylene glycol-n-propyl ether, propylene glycol-n-butyl ether, dipropylene glycol methyl ether, dipropylene glycol ethyl ether, dipropylene glycol-n-propyl ether, dipropylene glycol-n-butyl ether, tripropylene glycol methyl ether, tripropylene glycol ethyl ether, tripropylene glycol-n-propyl ether and tripropylene glycol-n-butyl ether. This component will typically be present in an amount of from about 2% to about 15% percent by weight of the ink, e.g., from about 5 to about 10%.

Also important to the inks of the invention is the presence of a material that will reduce the tendency of paper and other hydrophilic substrates to curl due to the application of the inks of the invention in amounts effective for their function. One preferred agent is 1-methyl 1,3-propanedial, and other 1,3 diols and 1,3,5 triols and derivatives thereof. Similarly, other agents such as 1,3-propane diol, 2,2-diethyl-1,3,propanediol, 2-methyl-2-ethyl-1,3-propanediol, 2,4, pentanediol, 1,3,5-pentanetriol, and derivatives, can be employed. This component will typically be present in an amount of from about 1% to about 15% percent by weight, e.g from about 2 to about 10%, in the case of hydrophilic substrates. In the case of hydrophobic substrates, the function of the anticurl agent can be met by using suitably high concentrations of the hydrophilic polymer with lower concentrations of water.

The inks of the invention are aqueous and will preferably include at least about 30 percent water. The compositions utilized for hydrophilic substrates can have moisture contents near the upper end of the range, e.g., from about 50 to about 90 percent, say from about 60 to about 85 percent, while those for use on hydrophobic substrates can function well with lower water contents e.g., from about 30 to about 60 percent, say from about 30 to about 50 percent.

It is an advantage of the invention that the ink formulations of the invention can be coated on inkjet receptive and non-receptive substrates while adding the necessary postal fluorescent signature for facing, and enable ease of full-color printing by inkjet printing with no necessary modification of inkjet equipment or inks. The substrates are preferably coated by doctoring or offset techniques effective to provide a coating thickness of at least about 0.0001 inch, e.g, from about 0.0015 to about 0.02 inch. The amount will be sufficient to provide an acceptable USPS fluorescent signal and will vary from composition to composition.

Figure 2:
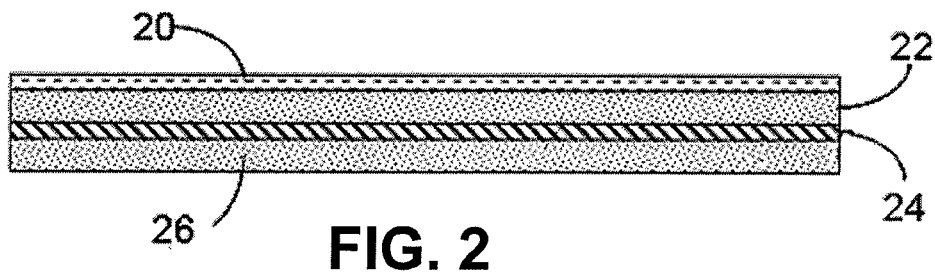
FIG. 2 is an enlarged cross section along line 1-1 in FIG. 1.
Figure 3:
FIG. 3 is a schematic representation of a full sheet of stamps produced by the invention.
Figure 4:
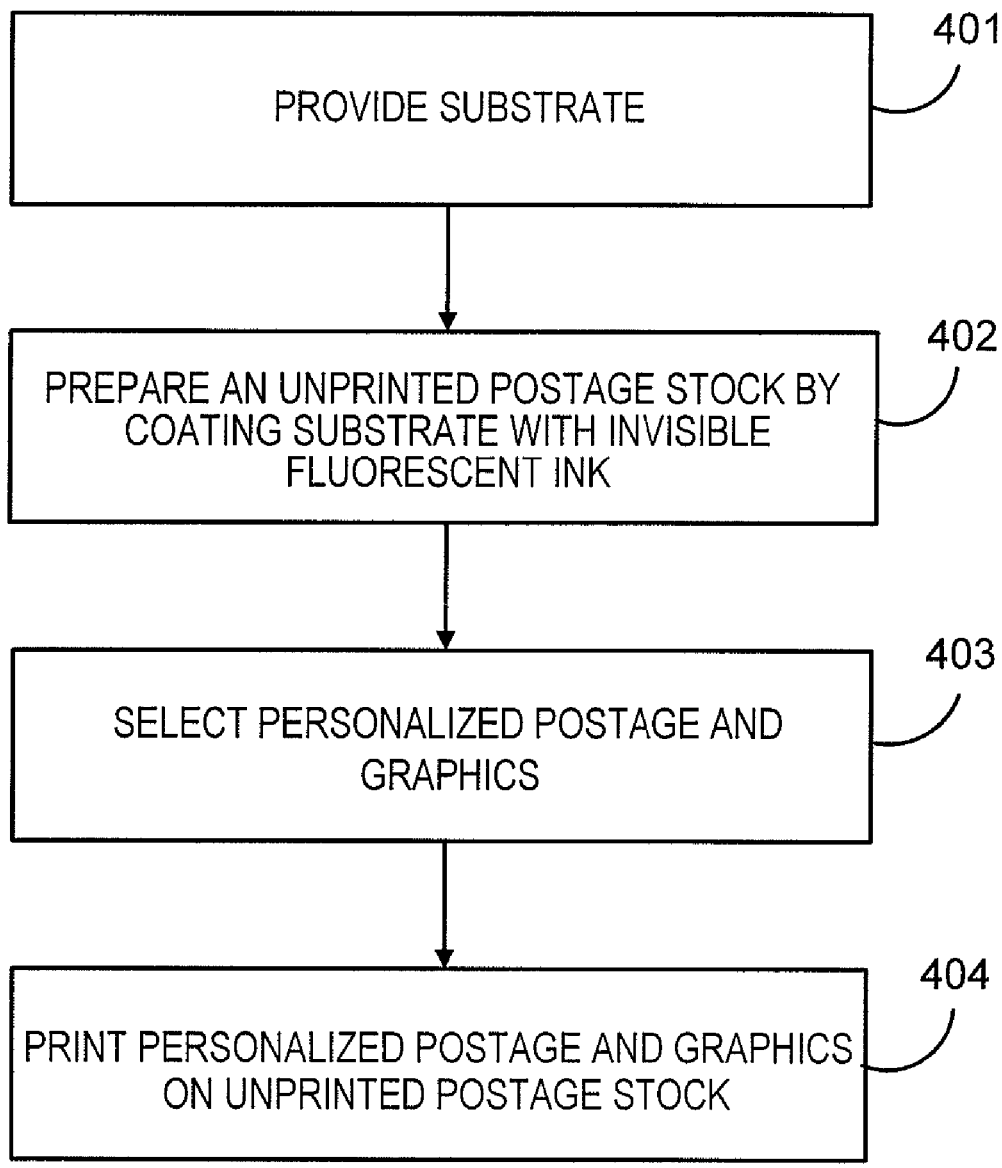
FIG. 4 is a block diagram of a system for printing postage according to the invention.

Reference is made to FIG. 1, which is a schematic representation of a single postage stamp 19 printed with personalized graphics 12, 12' and text 12", a barcode 14 and postage amount 16 that can be printed in accord with the invention. Reference to FIG. 2 shows an enlarged cross section along line 1-1 in FIG. 1, just outside of the area of printing, which has been printed by inkjet printing. Thus, the drawing depicts the unprinted postage printing stock prepared according to the invention. This stock includes the ink composition layer of the invention 20, the printable substrate 22, an adhesive layer 24 and a removable backing 26. The printed graphics, text and barcode illustrated on FIG. 1 will be on top of layer 20 but are not depicted in FIG. 2. A schematic representation of a full sheet of stamps 30 produced by the invention is shown in FIG. 3. And, FIG. 4 is a block diagram of a system for printing postage according to the invention. Printed postage, which comprises postage and custom indicia printed on a postage print stock as defined above can be made by known stamp printing techniques modified by the use of the invention. For example, a process such as described in either of the Ogg, et al., or Kara patents referenced above, can be employed. In FIG. 4, the first block represents the step of providing a suitable printing substrate, which is then modified to provide an unprinted postage printing stock in the second block by applying a coating of a ink formulation of the invention. Then, in the third block, personalized postage and graphics are selected. Finally, in the fourth block the unprinted postage printing stock is printed by inkjet printing to provide high-quality, personalized postage that should please the consumer and be within USPS regulations.

The following examples are presented to further illustrate and explain the invention and should not be taken as limiting in any regard. Unless otherwise indicated, all parts and percentages are by weight.

EXAMPLE 1

An ink was prepared according to the invention having a formulation as indicated in the following Table.

| Component | %, Wt. |
| --- | --- |
| Lumilux Red CD 380 (invisible, red-fluorescent dye) | 0.75% |
| Polyvinylpyrolidone (MW 1200) (binder) | 2.0% |

-continued

| Component | %, Wt. |
| --- | --- |
| Isopropyl Alcohol (drying promoter) | 5.0% |
| BTG (penetrant) | 10.0% |
| 2-Pyrrolidone (fluorescence stabilizer) | 10% |
| 1,3 Propanediol (anti curl agent) | 10% |
| Distilled $H_2O$ | 62.25% |

This ink is red fluorescent and phosphorescent, the fluorescence property has a PMU of 42 when measured in a barcode area printed on a sample image on inkjet photo paper. Fluorescence measured in shaded area with a USPS LM-2C PMU Meter. (PMU=Phosphor Meter Units)

This formulation was coated on photo or plain paper inkjet substrates and was completely invisible to the eye. When overprinted by commercially-available inkjet printers from Hewlet Packard, Canon and Epson, the print quality is identical to uncoated paper. This formulation will work effectively on water receptive materials, plain and photo papers and will not at all change the printability, gloss, color, or any other media characteristics.

EXAMPLE 2

Another formulation, is provided that can be used on any substrate to make the surface printable (e.g., can be used on hydrophobic surfaces such as vinyls, laser papers) and meets the USPS requirements.

| Component | %, Wt. |
| --- | --- |
| CD 380 (invisible, red-fluorescent dye) | 1.5% |
| BTG (penetrant) | 5.0% |
| Polyvinylpyrolidone (M.W. 2500) | 5.0% |
| Polyvinyl alcohol (binder) | 8.0% |
| 2-Pyrrolidone (fluorescence stabilizer) | 10% |
| 1-methyl 1,3 propanediol | 12% |
| Silcron IJ-25 (colloidal silica-hydrophilic absorber) | 25% |
| Distilled Water | 32.5% |

EXAMPLE 3

Another formulation is provided similar to Example 2, but this time employing the L212 pigment.

| Component | %, Wt. |
| --- | --- |
| 10% L212 (invisible, red-fluorescent pigment) | 1.5% |
| BTG (penetrant) | 5.0% |
| Polyvinylpyrolidone (M.W. 2500) | 5.0% |
| Polyvinyl alcohol (binder) | 8.0% |
| 2-Pyrrolidone (fluorescence stabilizer) | 10% |
| 1-methyl 1,3 propanediol | 12% |
| Silcron IJ-25 (colloidal silica-hydrophilic absorber) | 25% |
| Distilled Water | 32.5% |

EXAMPLE 4

This example presents an additional formulation based on a dye, but that changes a surface from hydrophobic to hydrophilic:

| Component | %, Wt. |
| --- | --- |
| CD380 (invisible, red-fluorescent dye) | 1.5% |
| BTG (penetrant) | 5.0% |
| 2-Pyrrolidone (fluorescence stabilizer) | 10% |
| Vivaprint 200 (dimethylaminopropyl methacrylamide hydroxyethyl methacrylate, a hydrophilic terpolymer available from International Special Products. | 15% |
| Polyvinylpyrolidone | 20% |
| Distilled H20 | 48.5% |

EXAMPLE 5

This example presents an additional formulation that is similar to that of Example 4, but utilizes a pigment instead of a dye.

| Component | %, Wt. |
| --- | --- |
| 10% L212 (invisible, red-fluorescent pigment) | 1.5% |
| BTG (penetrant) | 5.0% |
| 2-Pyrrolidone (fluorescence stabilizer) | 10% |
| Vivaprint 200 (dimethylaminopropyl methacrylamide hydroxyethyl methacrylate, a hydrophilic terpolymer available from International Special Products. | 15% |
| Polyvinylpyrolidone | 20% |
| Distilled H20 | 48.5% |

The above description is intended to enable the person skilled in the art to practice the invention. It is not intended to detail all of the possible modifications and variations, which will become apparent to the skilled worker upon reading the description. It is intended, however, that all such modifications and variations be included within the scope of the invention which is seen in the above description and otherwise defined by the following claims. The claims are meant to cover the indicated elements and steps in any arrangement or sequence which is effective to meet the objectives intended for the invention, unless the context specifically indicates the contrary.

The invention claimed is:

1. An ink formulation for use on printable substrate to prepare inkjet receptive postage printing stocks for printing USPS-compliant postage with an inkjet printer, wherein the inks comprise:
    invisible fluorescent dye and/or pigment, which is fluorescent in the range of 580 to 640 nm when illuminated with light at 254 nm; water-soluble binder; substrate penetrant, fluorescence stabilizer; substrate anticurl agent and water, further comprising:
    a hydrophilic absorber, wherein,
    the ink formulation comprises 25 weight percent of hydrophilic absorber.

2. The ink formulation according to claim 1, wherein, the hydrophilic absorber consists of colloidal silica.

3. An ink formulation for use on printable substrate to prepare inkjet receptive postage printing stocks for printing USPS-compliant postage with an inkjet printer, wherein the inks comprise:
    invisible fluorescent dye and/or pigment, which is fluorescent in the range of 580 to 640 nm when illuminated with light at 254 nm; water-soluble binder; substrate penetrant, fluorescence stabilizer; substrate anticurl agent and water, wherein the anticurl agent comprises from 1 to 15 weight percent of a 1,3 diol.

4. An ink formulation for use on printable substrate to prepare inkjet receptive postage printing stocks for printing USPS-compliant postage with an inkjet printer, wherein the inks comprise:
    invisible fluorescent dye and/or pigment, which is fluorescent in the range of 580 to 640 nm when illuminated with light at 254 nm; water-soluble binder; substrate penetrant, fluorescence stabilizer; substrate anticurl agent and water, wherein the anticurl agent comprises from 1 to 15 weight percent of a 1,3,5 triol.

* * * * *